(12) United States Patent
Chung

(10) Patent No.: US 7,007,149 B2
(45) Date of Patent: Feb. 28, 2006

(54) DYNAMICALLY STORING PIM/ADDRESS BOOK DATA BY TYPE

(75) Inventor: Ki Hyun Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 547 days.

(21) Appl. No.: 10/017,584

(22) Filed: Dec. 18, 2001

(65) Prior Publication Data

US 2002/0077155 A1    Jun. 20, 2002

(30) Foreign Application Priority Data

Dec. 19, 2000   (KR) .............................. 2000-78150

(51) Int. Cl.
*G06F 12/00* (2006.01)

(52) U.S. Cl. ........................ 711/170; 711/154; 707/1; 707/100

(58) Field of Classification Search ................ 711/173, 711/172; 707/103 Z, 103 X
See application file for complete search history.

(56) References Cited

U.S. PATENT DOCUMENTS

| | | | | |
|---|---|---|---|---|
| 5,963,642 | A * | 10/1999 | Goldstein | 713/193 |
| 6,112,209 | A * | 8/2000 | Gusack | 707/101 |
| 6,169,993 | B1 * | 1/2001 | Shutt et al. | 707/103 R |
| 6,247,043 | B1 * | 6/2001 | Bates et al. | 709/200 |
| 6,269,369 | B1 * | 7/2001 | Robertson | 707/10 |
| 6,397,223 | B1 * | 5/2002 | Kori | 707/102 |
| 2003/0069874 | A1 * | 4/2003 | Hertzog et al. | 707/1 |

OTHER PUBLICATIONS

Rivituso, Monica, www.SmartMoney.com, Oct. 4, 2000. "There's a Cell Phone in My PDA.".*
Tanenbaum, Andrew, Structured Computer Organization, 1976, Prentiss-Hall, pp. 118-119.*
Gonnet, G. H., et. al., Handbook of algorithms and Data Structures in Pascal and C, 1991 Addison-Wesley, 2nd ed., Ch. 3.2.1.*
Varga, Richard and Harrison, Michael, eds., The Art of Computer Programming, 1973 Addison-Wesley, 2nd edition, vol. 1, pp. 244-247.*

* cited by examiner

*Primary Examiner*—Donald Sparks
*Assistant Examiner*—Jesse Diller
(74) *Attorney, Agent, or Firm*—Fleshner & Kim, LLP

(57) ABSTRACT

A method for using a memory area of a mobile communication terminal is disclosed. The method is directed toward managing a personal information manager (PIM) in a mobile telecommunication phone. A memory area is assigned to each field and an index number is designated according to a type of data in the memory area. For inputting data in a memory area, the user inputs data in a memory, searches for existence of a corresponding index of the entered data, and updates the relevant data based on the search result. The useable area of memory is thus expanded and more efficiently used by classifying available memory areas and designating an index number to each field.

22 Claims, 5 Drawing Sheets

| 1 | Name field 1 |
|---|---|
| 2 | Name field 2 |
| : | ...... |

| 1 | Company field 1 |
|---|---|
| 3 | Company field 2 |
| : | ...... |

| 2 | Home phone number field 1 |
|---|---|
| 5 | Home phone number field 2 |
| : | ...... |

| 3 | Cellular phone number field 1 |
|---|---|
| 4 | Cellular phone number field 2 |
| : | ...... |

| 2 | Pager number field 1 |
|---|---|
| 5 | Pager number field 2 |
| : | ...... |

| 6 | E-mail address field 1 |
|---|---|
| 8 | E-mail address field 1 |
| : | ...... |

| 6 | Fax number 1 |
|---|---|
| 8 | Fax number 2 |
| : | ...... |

| 6 | Birthday field 1 |
|---|---|
| 8 | Birthday field 2 |
| : | ...... |

Fig. 2
(Related art)

| | | |
|---|---|---|
| 1 | Name | ⎫ |
| | Office phone number | ⎪ |
| | Home phone number | ⎪ |
| | Cellular phone number | ⎬ A plurality |
| | Pager number | ⎪ of data |
| | E-mail address | ⎪ |
| | Fax number | ⎪ |
| | Birthday | ⎭ |
| 2 | Name | |
| | Office phone number | |
| | Home phone number | |
| | Cellular phone number | |
| | Pager number | |
| | E-mail address | |
| | Fax number | |
| | Birthday | |
| ⋮ | ⋮ | |

Fig. 3

| 1 | Name field 1 |
|---|---|
| 2 | Name field 2 |
| : | ...... |

| 1 | Company field 1 |
|---|---|
| 3 | Company field 2 |
| : | ...... |

| 2 | Home phone number field 1 |
|---|---|
| 5 | Home phone number field 2 |
| : | ...... |

| 3 | Cellular phone number field 1 |
|---|---|
| 4 | Cellular phone number field 2 |
| : | ...... |

| 2 | Pager number field 1 |
|---|---|
| 5 | Pager number field 2 |
| : | ...... |

| 6 | E-mail address field 1 |
|---|---|
| 8 | E-mail address field 1 |
| : | ...... |

| 6 | Fax number 1 |
|---|---|
| 8 | Fax number 2 |
| : | ...... |

| 6 | Birthday field 1 |
|---|---|
| 8 | Birthday field 2 |
| : | ...... |

DYNAMICALLY STORING PIM/ADDRESS BOOK DATA BY TYPE

BACKGROUND OF THE INVENTION

1. Field of the Invention

The present invention relates to a mobile communication terminal, and more particularly to a method for efficiently using a memory area in a mobile telecommunication phone.

2. Background of the Related Art

In a related art mobile communication terminal, when a user wants to save particular information, e.g., a telephone number, in a memory area of the terminal, the user is permitted to save only one telephone number for one person per index.

FIG. 1 is a structural diagram to illustrate a memory pattern for saving information to an index where the index accommodates only one storage space for a person.

A more advanced related art mobile phone was soon developed. This phone reserved more data storage space per index, so that a user was able to save several telephone numbers, fax numbers, or e-mail addresses for one person in a single index.

FIG. 2 is a structural diagram of a memory area to illustrate a pattern for saving information to an index where an index is assigned with a plurality of storage spaces for a person. Referring to FIG. 2, a single memory area is thus designated to save all personal information in one index.

For example, in index No. 1, the user can input personal information of an intended person, such as that person's name, office phone number, home phone number, cellular phone number, pager number, e-mail address, fax number, or birthday. In index No. 2, the user can input a second person's information in a similar way. That is, the user can input the second person's name, office phone number, home phone number, cellular phone number, pager number, e-mail address, fax number, or birthday. In this manner, personal information of additional persons may be saved in the other indexes.

The related art memory area structures and methods shown in FIGS. 1 and 2 have various problems. For example, these memories are operated within the limited memory capacity assigned to the mobile phone. Thus, if there are more than two kinds of personal information for a person, at least two indexes in the mobile phone are needed, which consequently makes it difficult for the user to effectively manage the data. Even if there is little information for a given person, a full memory area for an index is still occupied for that person. The remaining fields of the index are left unused, thereby wasting a lot of memory.

For example, if the user inputs only an office phone number and a home phone number of a desired person, and does not input any other information for that person, i.e., the cellular phone number, pager number, e-mail address, fax number, or birthday, the entire corresponding memory storage space is still allocated but remains mostly unused.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a method for efficiently using a limited memory area in a mobile phone.

It is another object of the present invention to provide a method for assigning a memory area in a mobile communication terminal, in accordance with type of information, each group containing the same kind of personal information of different people, and by designating a corresponding index to a field in the group.

It is another object of the present invention to provide a method for using memory area in a mobile communication terminal ("mobile phone") by extending its role not only for telephone communications but also for a personal information manager, including an address book, a telephone directory, a day planner, or an organizer.

It is another object of the present invention to provide a method for expanding the usability of a memory in a mobile phone, by classifying an available memory into a field, which used to be unoccupied in the conventional system, and designating an index number to each field to save a personal information in a relevant group.

To achieve at least the above objects in whole or in parts, there is provided a method for using a memory area in a mobile communication terminal including assigning a memory region to each of a plurality of data fields, designating an index number according to types of data in the memory region, and assigning a same index number to a plurality of data items in the plurality of data fields that belong to a same class.

In order to further achieve at least the above objects in whole or in parts, there is provided a method for using a memory area in which a user inputs an intended information in the memory area, finds out whether or not an index corresponding to the entered data exists, and updates the relevant data based on the judgment.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 is a diagram of a related art memory area illustrating a pattern for saving information to an index where an index is assigned with a plurality of storage spaces for a person;

FIG. 3 is a diagram illustrating a memory area of a mobile telecommunication phone according to the preferred embodiment of the present invention;

DETAILED DESCRIPTION OF PREFERRED EMBODIMENTS

Figure 1:
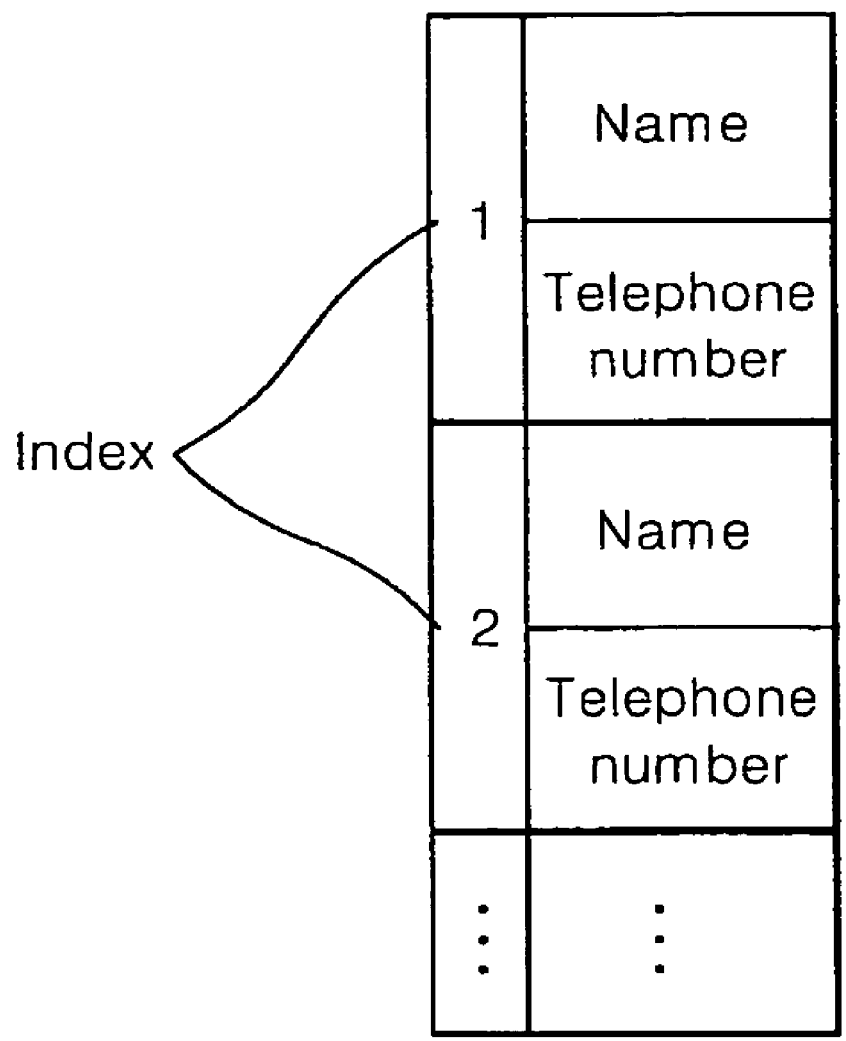
FIG. 1 is a diagram illustrating a related art pattern of a storage space per capita in an index.

FIG. 3 illustrates a structure of a memory area in a mobile phone according to the preferred embodiment of the present invention. The structure shown in FIG. 3 allows for allocating the memory area by prescribed identification items (for example, name, company, e-mail address and/or fax number, etc.). It should be understood that the memory allocation shown in FIG. 3 is provided by way of example, and that any identification items or combination of identification items could be used. Thus, the "company" field could be replaced by an "address" field, or any other field. Regardless of the names of the fields, however, all items that have a common identity are preferably stored according to the allocation method herein described.

As shown in FIG. 3, the preferred embodiment classifies the entire memory area into individual groups for data storage. Specifically, groups could include a name group, an office phone number group, home phone number group, a cellular phone number group, a pager number group, an e-mail address group, a fax number group, and a birthday group. Each field in a respective group is assigned with a corresponding index, respectively, to help a user access the data. Associated data items in the respective fields share an index number.

For instance, in the name group of FIG. 3, a first designated name having index No. 1 is saved in the first field of the name group. Another name associated with index No. 2 is saved in the second field of the name group. Additional names and associated index numbers can be saved in the remaining fields of the name group.

Similarly, in the company group, a designated company name associated with index No. 1 is saved in the first field of the company group, and so on. However, when any individual field is not occupied, for example, if a given index number has no data for the field, instead of leaving the field empty, the next available data is stored in that field, regardless of the index number. For example, if there is no data for a company corresponding to a name in a second field associated with index No. 2, the field in the company group becomes available for the next company name instead of remaining unused. Thus, the company data corresponding to a third designated name for index No. 3 is saved in the second field of the company group.

Furthermore, if there is no home phone number corresponding to the first designated name for index No. 1 in the home phone number group, and the next provided home phone number corresponds to the second name for index No. 2, then the home phone number of the second name is recorded in the first field of the home phone number group, which was originally reserved for the first designated name. If the phone number associated with the first name and having index No. 1 is assigned to the first field, but there is no home phone number data corresponding to the second, third, or fourth names, then instead of leaving the fields unoccupied, a home phone number corresponding to the fifth designated name for index No. 5 is recorded in the second field of the home phone number group.

The same information saving processes are applied to the group areas for any other information to be stored, such as cellular phone numbers, pager numbers, e-mail addresses, and birthdays, for example.

If missing information is later provided the newly provided data is sequentially inserted into the index order of the appropriate group. For example, if no company name for the second name (Index No. 2) had initially been provided, but first and third company names had been provided, then the third company name (Index No. 3) would have been stored in the second company name field. If a company name associated with the second name (Index No. 2) is later provided, then the second company data provided afterwards takes its original storage space back. That is, the second field of the company group is populated with the second company name. The company data that had originally been stored in field 2 (i.e., the company associated with the third name) goes back to the next memory field when the second field is filled, (i.e., the third field). In other words, if required, data can be shifted automatically from one field to another field.

The same memory space assigning method described above holds true for other fields. Hence, according to the preferred embodiment, it is not necessary to fill in an assigned memory area, especially when desired information is not available.

Figure 4:
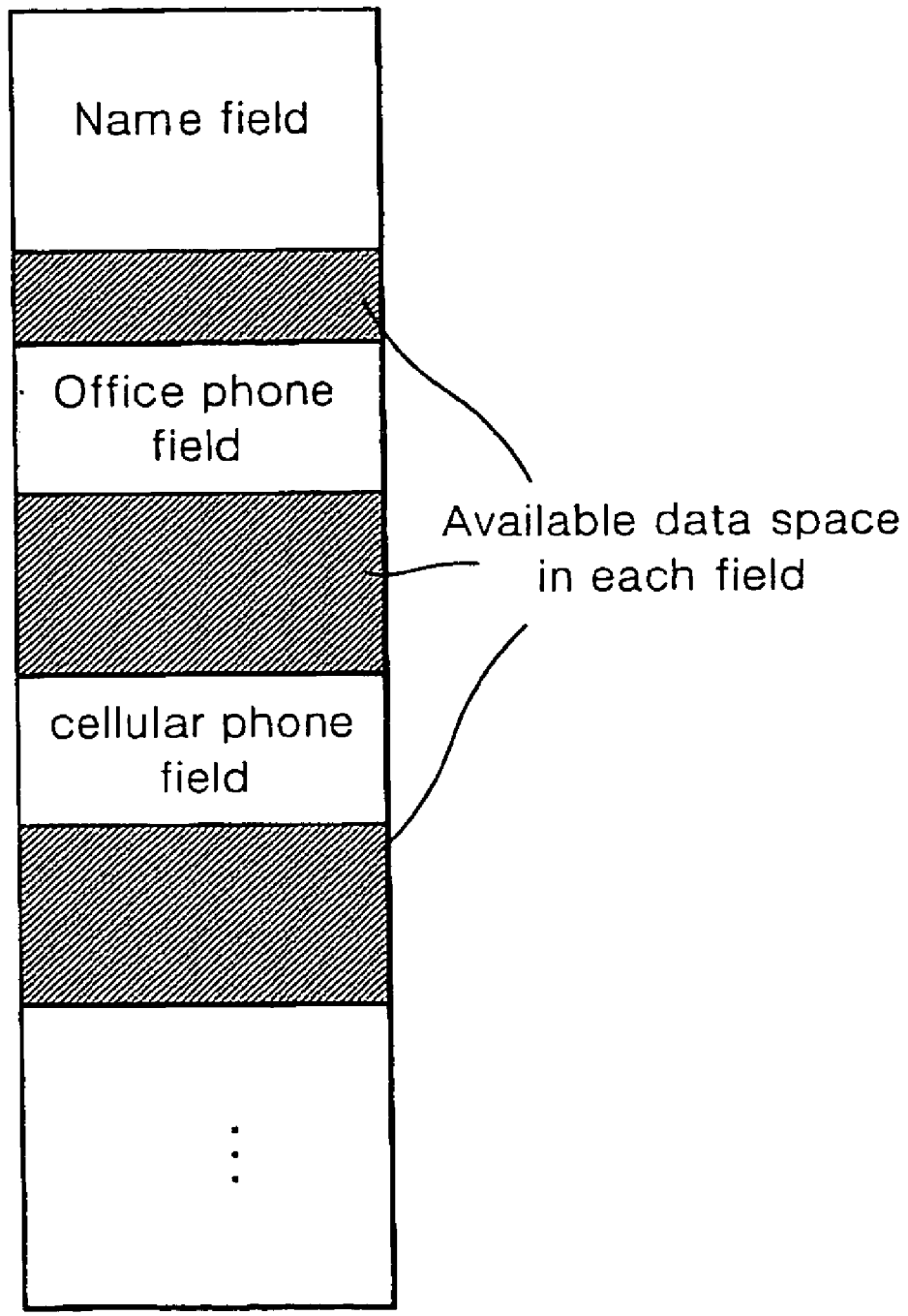
FIG. 4 is a diagram illustrating the saved memory area according to FIG. 3.

FIG. 4 is a structural diagram illustrating the saved memory area according to the memory saving method depicted in FIG. 3. The shaded portion in FIG. 4 indicates the memory areas, which had been left unused in the related art memory assignment structure of FIG. 2 due to unavailability of data, but which are being efficiently used according to the preferred embodiment of the present invention. Thus, previously unoccupied memory areas are converted into usable memory for other data. All vacant memory areas created due to lack of necessary information for inputting to each field can therefore be used.

Figure 5:
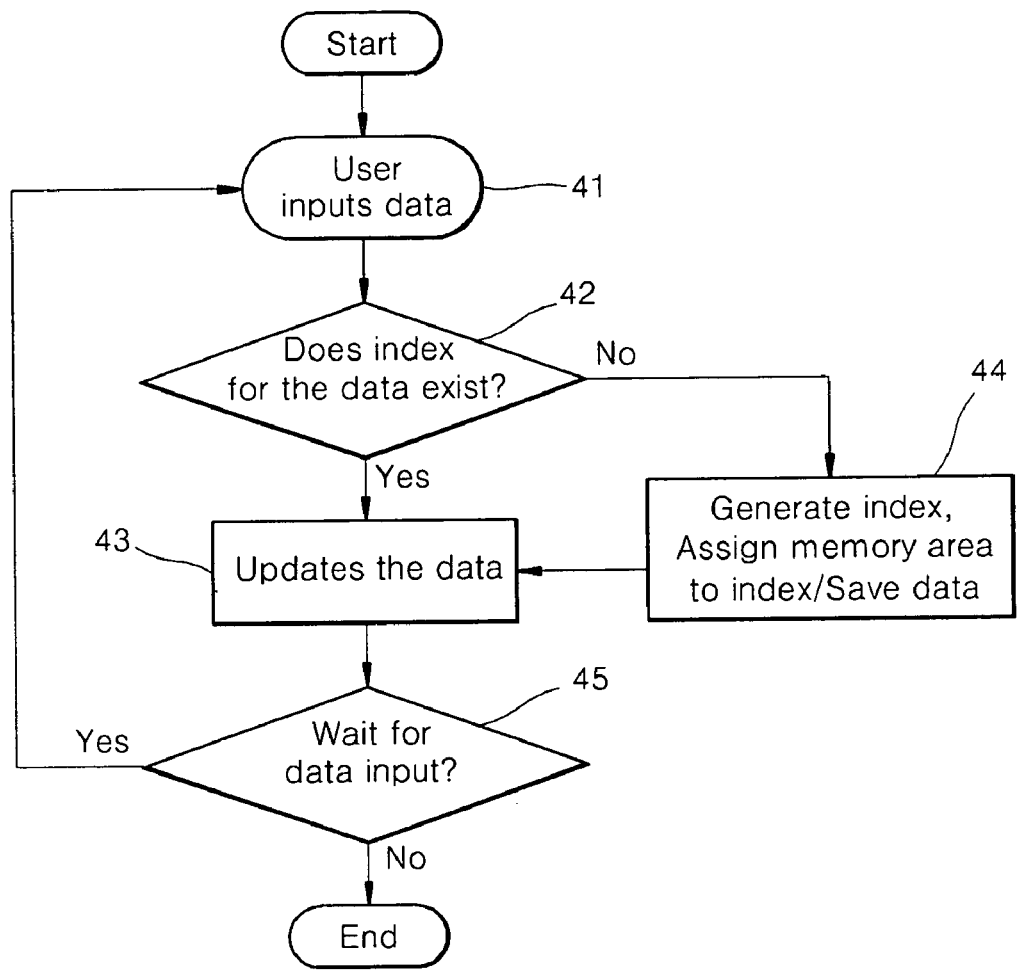
FIG. 5 is a flow chart of an example illustrating a method for efficiently using a memory area according to the preferred embodiment of the present invention.

FIG. 5 is a flow chart which illustrates a method of how to use a memory area more efficiently according to the preferred embodiment. As shown in the FIG. 5, a user first inputs a name of an intended person for storage (Step 41). When a name is entered, the search for the prerecorded same name is preferably automatically conducted. A user, however, may also manually check to determine whether there is an index corresponding to the name of the person being entered (Step 42).

If it is determined that a prerecorded index already exists, the user renews the identification item (field) in the index and/or updates with new data (Step 43). The method then waits for user data input (Step 45). When the user inputs data, the method returns to Step 41. However, if a corresponding index does not already exist, the user creates a new index and assigns an appropriate memory area to save corresponding identification item data (Step 44).

In other words, when the user inputs personal information manager (PIM) related information to a mobile phone, it is classified on the basis of a name of a person to be entered. If the same name already exists, the user finds the index that has been assigned to that field (identification item), and accesses the corresponding memory area to update the information.

For example, assume that the name "Jung Gee Hyun" is to be entered, and the corresponding index number is "1". In this case, the index number "1" in each field is reserved for the information regarding "Jung Gee Hyun". Thus, if a user wishes to change or update the data for "Jung Gee Hyun", the user must select a field first, and then input the index number "1". Alternatively, a user can input "Jung Gee Hyun" as a key word after selecting a field, and search for a corresponding index number, i.e., "1", for updating the data.

Similarly, if a user wishes to change or update the existing data in each field, the user can use an index number corresponding to a field name index for changing or updating the desired information i.e., office phone number, home phone number, cellular phone number, beeper number, E-mail address, fax number or birthday,.

If there is no assigned index number to a corresponding name, the part of an unoccupied memory area can be designated for a new index, and a user can save PIM related information as intended.

If a new name is to be added, the user designates a new index number for the new name, and saves various information (for example, company data, home phone number data, cellular phone data, etc.) using the newly designated index number aforementioned.

The preferred embodiment of the present invention has many advantages. For example, it provides for classification of personal information into a memory area of a mobile phone by different identification items (for example, name, company, etc.). It also allows for saving information of the same category in one field with different index numbers.

In addition, the preferred embodiment provides a method for using a memory area in a mobile phone whereby a name of a person is entered and assigned a prescribed index number. Other data on specific identification items can then be added by searching a corresponding index to the entered name of the person. If a desired index is found, data on the identification item corresponding to the index can be added or updated. If a desired index is not available, an appropriate memory area can be assigned to a new index, and the data on the corresponding identification item can be saved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for using a memory area in a mobile communication terminal, comprising:
   assigning a memory region to each of a plurality of data fields;
   designating an index number according to types of data in the memory region, and
   assigning a same index number to a plurality of data items in the plurality of data fields that belong to a same class,
   wherein each of the plurality of data items belonging to the class is associated with a different data field, and
   wherein if data for a first field is not present for a first index, data for the first field from a second index is stored in a first data area of the first data field memory region.

2. The method of claim 1, wherein data is saved in each of the plurality of field by an individual index number.

3. The method of claim 1, wherein the plurality of fields comprises at least one of a name field, a company name field, an e-mail address field, a telephone number field, and a fax number field.

4. The method of claim 1, wherein the data corresponds to information regarding an individual.

5. The method of claim 1, wherein each class represents a single person.

6. The method of claim 1, wherein if data for the first field of the first index is subsequently provided, the data for the first field of the first index is saved in the first data area of the first data field memory region, and the data for the first field from the second index is moved to a second data area of the first data field memory region.

7. A method for using a memory area in a mobile communication terminal, comprising:
   assigning a memory region to each of a plurality of data fields;
   designating an index number according to types of data in the memory region,
   assigning a same index number to a plurality of data items in the plurality of data fields that belong to a same class,
   wherein a prescribed memory region is accessed by inputting the index number or a key word, and
   wherein data is saved in a corresponding memory region of each field in index order, and the data can be shifted automatically from a first data area in the memory region for the field, a second data area in the memory region for the field to maintain the index order.

8. The method of claim 7, wherein if subsequently entered data has a priority index number when compared to an existing index number, the subsequently entered data is saved in a corresponding index number location, and the existing data is moved to a next data location.

9. A method for inputting data in a memory area in a mobile communication terminal, comprising:
   inputting data in the memory area of the mobile communication terminal by a user;
   searching for an existence of a corresponding index of the entered data;
   updating the relevant data if the corresponding index is found; and
   assigning a same index number to a plurality of data items respectively stored in the memory area that belong to a same class,
   wherein the memory area is divided into memory regions corresponding to the plurality of data items, data is saved in a corresponding memory region of each data item in index order, and the data can be shifted automatically from a first memory region to a second memory region to maintain the index order.

10. The method of claim 9, further comprising creating a new index for the entered data if the corresponding index for the entered data does not exist.

11. A method of managing a memory in a mobile communication device, comprising:
   assigning a common index number to all data fields of a same class;
   allocating a plurality of data fields in a memory area by field groups; and
   sequentially storing data having a corresponding index number and that corresponds to a respective field group in a next available memory location in the field group.

12. The method of claim 11, wherein a next available index number is assigned to all data fields of an added class.

13. The method of claim 11, wherein if data for a prescribed data field of a first class is not initially provided, and is subsequently inputted into the memory, it is assigned an index number that is common to the first class, and it is stored in a first data location for a prescribed data field group in the memory.

14. The method of claim 13, wherein if data for the prescribed data field corresponding to a second class is initially stored in the first data location for the prescribed data field group, the data for the prescribed data field corresponding to a second class is moved to a second data location for the prescribed data field in the memory.

15. The method of claim 11, wherein the data fields are selected from among an address field, a telephone number field, an e-mail address field, a company name field, a fax number field, and a pager number field, and wherein the same class may include fewer than all of the data fields.

16. A method of managing a memory in a mobile communication device, comprising:
   inputting a plurality of data groups into a memory, each of the plurality of data groups having a corresponding plurality of data fields and each of the corresponding plurality of data fields for a given one of a plurality of class data having a common index number; and
   organizing the plurality of class data by data fields in the memory in index order, wherein if a first data group is provided without data for prescribed data field and a second data group is provided with data for the prescribed data field, the data for the prescribed data field corresponding to the second data group is stored in a first data location for the prescribed data field in the memory.

17. The method of claim 16, wherein if data for the prescribed data field of the first data group is subsequently inputted into the memory, it is assigned an index number that is common to the first data group, and it is stored in the first data location for the prescribed data field in the memory, and the data for the prescribed data field corresponding to the second data group is moved to a second data location for the prescribed data field in the memory.

18. The method of claim 16, wherein if a subsequent data group is inputted, it is assigned a next sequential index number, and data from each of the plurality of data fields of the subsequent data group is stored in a next available data location in the memory that corresponds to the field.

19. The method of claim 16, wherein the plurality of data fields are selected from among an address field, a telephone number field, an e-mail address field, a company name field, a fax number field, and a pager number field.

20. The method of claim 16, wherein any of the plurality of data groups may include fewer than all of the data fields.

21. A mobile communication terminal, comprising:
   means for storing a plurality of data groups into a memory, each of the plurality of data groups having a corresponding plurality of data fields and each of the corresponding plurality of data fields for a given one of a plurality of class data having a common index number; and
   means for organizing the plurality of class data by data fields in the memory in index order, wherein if a first data group is provided without data for prescribed data field and a second data group is provided with data for the prescribed data field, the data for the prescribed data field corresponding to the second data group is stored in a first data location for the prescribed data field in the memory.

22. The terminal of claim 21, wherein if data for the prescribed data field of the first data group is subsequently inputted into the memory, it is assigned an index number that is common to the first data group, and it is stored in the first data location for the prescribed data field in the memory, and the data for the prescribed data field corresponding to the second data group is moved to a second data location for the prescribed data field in the memory.

* * * * *